(12) United States Patent
Zhou et al.

(10) Patent No.: US 9,489,671 B2
(45) Date of Patent: Nov. 8, 2016

(54) SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS

(71) Applicants: Andrew H B Zhou, Tiburon, CA (US);
Tiger T G Zhou, Tiburon, CA (US);
Dylan T X Zhou, Tiburon, CA (US)

(72) Inventors: Andrew H B Zhou, Tiburon, CA (US);
Tiger T G Zhou, Tiburon, CA (US);
Dylan T X Zhou, Tiburon, CA (US)

( * ) Notice: Subject to any disclaimer, the term of this patent is extended or adjusted under 35 U.S.C. 154(b) by 0 days.

(21) Appl. No.: 14/957,644

(22) Filed: Dec. 3, 2015

(65) Prior Publication Data
US 2016/0086161 A1 Mar. 24, 2016

Related U.S. Application Data

(63) Continuation-in-part of application No. 14/815,988, filed on Aug. 1, 2015, now Pat. No. 9,342,829, which is a continuation-in-part of application No. 12/749,412, filed on Mar. 29, 2010, now abandoned, (Continued)

(51) Int. Cl.
| | | |
|---|---|---|
| *G06F 3/0488* | (2013.01) | |
| *G06Q 20/32* | (2012.01) | |
| *G06Q 20/40* | (2012.01) | |
| *G06Q 20/34* | (2012.01) | |
| *G06F 3/041* | (2006.01) | |
| *G06Q 30/02* | (2012.01) | |
| *G06Q 20/12* | (2012.01) | |
| *G06Q 20/36* | (2012.01) | |

(52) U.S. Cl.
CPC ............ *G06Q 20/3276* (2013.01); *G06F 3/041* (2013.01); *G06F 3/04883* (2013.01); *G06F 3/04886* (2013.01); *G06Q 20/123* (2013.01); *G06Q 20/325* (2013.01); *G06Q 20/3224* (2013.01); *G06Q 20/3274* (2013.01); *G06Q 20/3278* (2013.01); *G06Q 20/34* (2013.01); *G06Q 20/363* (2013.01); *G06Q 20/40145* (2013.01); *G06Q 30/02* (2013.01); *G06Q 30/0209* (2013.01); *G06Q 30/0273* (2013.01); *G06Q 2220/00* (2013.01)

(58) Field of Classification Search
CPC ..................... G06Q 20/3274; G06Q 20/3829; G06Q 20/3276; G06Q 20/401; G06Q 20/041; G06Q 20/16; G06Q 20/3277; G06Q 20/40145; G06Q 20/322; G06F 3/04883; G06F 3/04886
See application file for complete search history.

(56) References Cited

U.S. PATENT DOCUMENTS

| | | | | |
|---|---|---|---|---|
| 6,985,748 B2 * | 1/2006 | Knotts | .............. | H04L 29/12009 455/412.1 |
| 7,890,089 B1 * | 2/2011 | Fujisaki | .................. | H04M 1/56 455/414.2 |

(Continued)

*Primary Examiner* — Daniel Walsh
(74) *Attorney, Agent, or Firm* — Georgiy L. Khayet

(57) ABSTRACT

Systems and methods for multimedia capture and payment transactions are provided. A system comprises a payment and multimedia capture means and a cloud-based application. The payment and multimedia capture means is configured to communicate with an external device, transmit key data from the payment and multimedia capture means to the external device. The cloud-based application is configured to receive the key data from the external device, provide a payment and multimedia capture interface on a display of the external device, receive haptic input via the haptic control, analyze the haptic input to determine a duration of the haptic input, select an operation based on the duration, and perform the selected operation. The operation include a payment operation and a multimedia capture operation.

28 Claims, 7 Drawing Sheets

Related U.S. Application Data and a continuation-in-part of application No. 14/034,509, filed on Sep. 23, 2013, which is a continuation-in-part of application No. 10/677,098, filed on Sep. 30, 2003, now Pat. No. 7,702,739, application No. 14/957,644, which is a continuation-in-part of application No. 13/185,491, filed on Jul. 18, 2011, now Pat. No. 9,367,841, and a continuation-in-part of application No. 13/287,279, filed on Nov. 2, 2011, now abandoned, and a continuation-in-part of application No. 13/620,775, filed on Sep. 15, 2012, now abandoned, and a continuation-in-part of application No. 13/646,706, filed on Oct. 7, 2012, and a continuation-in-part of application No. 13/661,207, filed on Oct. 26, 2012, now abandoned, and a continuation-in-part of application No. 13/760,214, filed on Feb. 6, 2013, now Pat. No. 9,016,565, and a continuation-in-part of application No. 13/857,308, filed on Apr. 5, 2013, now abandoned, and a continuation-in-part of application No. 13/875,311, filed on May 2, 2013, now abandoned, and a continuation-in-part of application No. 13/973,146, filed on Aug. 22, 2013, now Pat. No. 9,153,074, and a continuation-in-part of application No. 14/458,791, filed on Aug. 13, 2014, now Pat. No. 9,098,190, and a continuation-in-part of application No. 14/817,341, filed on Aug. 4, 2015, now Pat. No. 9,208,505.

(60) Provisional application No. 60/415,546, filed on Oct. 1, 2002.

(56) References Cited

U.S. PATENT DOCUMENTS

| | | | | |
|---|---|---|---|---|
| 8,639,214 B1* | 1/2014 | Fujisaki | | G06Q 20/32 379/88.03 |
| 8,676,273 B1* | 3/2014 | Fujisaki | | H04M 1/6505 379/142.06 |
| 8,985,442 B1* | 3/2015 | Zhou | | G06Q 30/02 235/375 |
| 9,021,021 B2* | 4/2015 | Backholm | | H04L 29/08099 709/203 |
| 9,047,600 B2* | 6/2015 | Zhou | | G06Q 20/322 |
| 9,098,190 B2* | 8/2015 | Zhou | | G06Q 20/3829 |
| 9,342,829 B2* | 5/2016 | Zhou | | G06Q 30/02 |
| 9,361,616 B2* | 6/2016 | Zhou | | G06Q 20/382 |
| 2002/0029342 A1* | 3/2002 | Keech | | G06Q 20/02 713/184 |
| 2002/0120846 A1* | 8/2002 | Stewart | | G06Q 20/04 713/168 |
| 2005/0211784 A1* | 9/2005 | Justin | | G06K 19/0718 235/492 |
| 2005/0247797 A1* | 11/2005 | Ramachandran | | G06K 19/08 235/492 |
| 2006/0045044 A1* | 3/2006 | Chiu | | H04W 52/0254 370/328 |
| 2006/0282660 A1* | 12/2006 | Varghese | | G06Q 20/341 713/155 |
| 2008/0210754 A1* | 9/2008 | Lovett | | G06Q 20/24 235/380 |
| 2009/0125429 A1* | 5/2009 | Takayama | | G06Q 20/04 705/35 |
| 2009/0207013 A1* | 8/2009 | Ayed | | G08B 13/1427 340/539.1 |
| 2010/0030578 A1* | 2/2010 | Siddique | | G06Q 10/0637 705/3 |
| 2010/0112964 A1* | 5/2010 | Yi et al. | | G04G 21/04 455/90.3 |
| 2011/0246284 A1* | 10/2011 | Chaikin | | G06Q 20/105 705/14.38 |
| 2012/0074217 A1* | 3/2012 | Block | | G06Q 20/327 235/379 |
| 2013/0014136 A1* | 1/2013 | Bhatia | | H04N 21/252 725/9 |
| 2013/0055001 A1* | 2/2013 | Jeong | | G06F 1/3228 713/323 |
| 2013/0080289 A1* | 3/2013 | Roy | | G06Q 30/06 705/26.8 |
| 2013/0096961 A1* | 4/2013 | Owens | | G06Q 10/02 705/5 |
| 2013/0110607 A1* | 5/2013 | Basmajian | | G06Q 30/0234 705/14.26 |
| 2014/0006195 A1* | 1/2014 | Wilson | | G06Q 20/322 705/21 |
| 2014/0108260 A1* | 4/2014 | Poole | | G06Q 20/3226 705/64 |
| 2015/0358541 A1* | 12/2015 | Wang | | G06F 3/011 348/220.1 |

* cited by examiner

FRONT VIEW
710

722
REAR VIEW
720

SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS

CROSS-REFERENCE TO RELATED APPLICATIONS

This application is a continuation-in-part of U.S. patent application Ser. No. 13/875,311, entitled "FACILITATING MOBILE DEVICE PAYMENTS USING MOBILE PAYMENT ACCOUNT, MOBILE BARCODE AND UNIVERSAL DIGITAL MOBILE CURRENCY," filed on May 2, 2013, U.S. patent application Ser. No. 13/620,775, entitled "METHODS AND SYSTEMS FOR FACILITATING MOBILE DEVICE PAYMENTS USING CODES AND CASHBACK BUSINESS MODEL," filed on Sep. 15, 2012, U.S. patent application Ser. No. 13/857,308, entitled "WEARABLE PERSONAL MINI CLOUD GAME AND MULTIMEDIA DEVICE," filed on Apr. 5, 2013, U.S. patent application Ser. No. 13/661,207, entitled "METHODS AND SYSTEMS FOR RECEIVING COMPENSATION FOR USING MOBILE PAYMENT SERVICES," filed on Oct. 26, 2012, U.S. patent application Ser. No. 13/760,214, entitled "WEARABLE PERSONAL DIGITAL DEVICE FOR FACILITATING MOBILE DEVICE PAYMENTS AND PERSONAL USE," filed on Feb. 6, 2013, U.S. patent application Ser. No. 13/973,146, entitled "WEARABLE AUGMENTED REALITY EYEGLASS COMMUNICATION DEVICE INCLUDING MOBILE PHONE AND MOBILE COMPUTING VIA VIRTUAL TOUCH SCREEN GESTURE CONTROL AND NEURON COMMAND," filed on Aug. 22, 2013, U.S. patent application Ser. No. 13/646,706, entitled "METHODS AND SYSTEMS FOR PREVENTING CARD PAYMENT FRAUD AND RECEIVING PAYMENTS USING CODES AND MOBILE DEVICES," filed on Oct. 7, 2012, U.S. patent application Ser. No. 13/287,279, entitled "METHODS AND SYSTEMS TO ADVERTISE AND SELL PRODUCTS OR SERVICES VIA CLOUD GAMING ENVIRONMENTS," filed on Nov. 2, 2011, and U.S. patent application Ser. No. 13/185,491, entitled "FACILITATING MOBILE DEVICE PAYMENTS USING PRODUCT CODE SCANNING," filed on Jul. 18, 2011, U.S. patent application Ser. No. 14/458,791, entitled "SYSTEMS AND METHODS FOR MESSAGING, CALLING, DIGITAL MULTIMEDIA CAPTURE AND PAYMENT TRANSACTIONS," filed on Aug. 13, 2014, U.S. patent application Ser. No. 14/815,988, entitled "SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS", filed on Aug. 1, 2015, which claims priority to U.S. patent application Ser. No. 12/749,412, entitled "EFFICIENT TRANSACTIONAL MESSAGING BETWEEN LOOSELY COUPLED CLIENT AND SERVER OVER MULTIPLE INTERMITTENT NETWORKS WITH POLICY BASED ROUTING", filed on Mar. 29, 2010, U.S. patent application Ser. No. 14/034,509, entitled "EFFICIENT TRANSACTIONAL MESSAGING BETWEEN LOOSELY COUPLED CLIENT AND SERVER OVER MULTIPLE INTERMITTENT NETWORKS WITH POLICY BASED ROUTING", filed on Sep. 23, 2013, U.S. patent application Ser. No. 14/817,341, entitled "SYSTEMS AND METHODS FOR PROVIDING COMPENSATION, REBATE, CASHBACK, AND REWARD FOR USING MOBILE AND WEARABLE PAYMENT SERVICES," filed on Aug. 4, 2015, and U.S. patent application Ser. No. 10/677,098, entitled "EFFICIENT TRANSACTIONAL MESSAGING BETWEEN LOOSELY COUPLED CLIENT AND SERVER OVER MULTIPLE INTERMITTENT NETWORKS WITH POLICY BASED ROUTING," filed on Sep. 30, 2003, which claims priority to U.S. Provisional Patent Application No. 60/415,546, entitled "DATA PROCESSING SYSTEM", filed on Oct. 1, 2002, and which are incorporated herein by reference in its entirety.

FIELD

This application relates generally to data processing, and more specifically to systems and methods for mobile application, wearable application, transactional messaging, calling, digital multimedia capture and payment transactions.

BACKGROUND

Mobile devices have changed the state of play in the field of communication and start changing the way of performing financial transactions of all types. Mobile devices are commonly applied for financial transactions via a web banking site. Payments via mobile devices may be associated with credit cards, debit cards, gift cards, and virtual currencies. While mobile payments facilitate and stimulate the trade, the procedure of providing financial details and authenticating of identity may be tedious and time-consuming. Moreover, entering and keeping financial details may present risks of data theft, unauthorized access to financial instruments of the user, and so forth. Therefore, security of mobile payments for daily micropayments is needs improvement.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are computer implemented methods and systems for payment and multimedia capture via a payment and multimedia capture means. The method for payment and multimedia capture via a payment and multimedia capture means includes establishing a communication between the payment and multimedia capture means and an external device by communication unit. When the communication is established, key data may be transmitted from the payment and multimedia capture means to the external device. The key data may be used to activate a cloud-based application. A payment and multimedia capture interface of the cloud-based application may be provided on a display of the external device. The payment and multimedia capture interface may include a haptic control configured to sense a haptic input of a user. The method may also include sensing the haptic input (e.g., a touch of the user to the haptic control) via the haptic control and analyzing the haptic input to determine a duration of the haptic input. Based on the duration of the haptic input, an operation may be selected from a list of predetermined operations to be performed by the cloud-based application. The predetermined operations may include a payment operation, a multimedia capture operation, and so forth. If the payment operation is selected, payment details associated with the user may be received from a cloud storage. The payment details are used to perform a payment via the external device. If the multimedia capture operation is selected, multimedia may be captured by a camera associated with the external device. The captured multimedia may be stored to the cloud storage.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Various computer implemented methods and systems for payment and multimedia capture via a payment and multimedia capture means are described herein. The described system enables a user to store multimedia to cloud and securely make payments in retail environments and e-commerce using an external device, for example, a smart phone or augmented reality glasses. User payment details may be stored in a cloud and provided to the external device to make a payment. To authorize access to and transmittal of the payment details, key data stored on the payment and multimedia capture means may be used. The payment and multimedia capture means may be in a form of a banking card and may include a communication unit (e.g., RFID chip) storing the key data.

Figure 1:
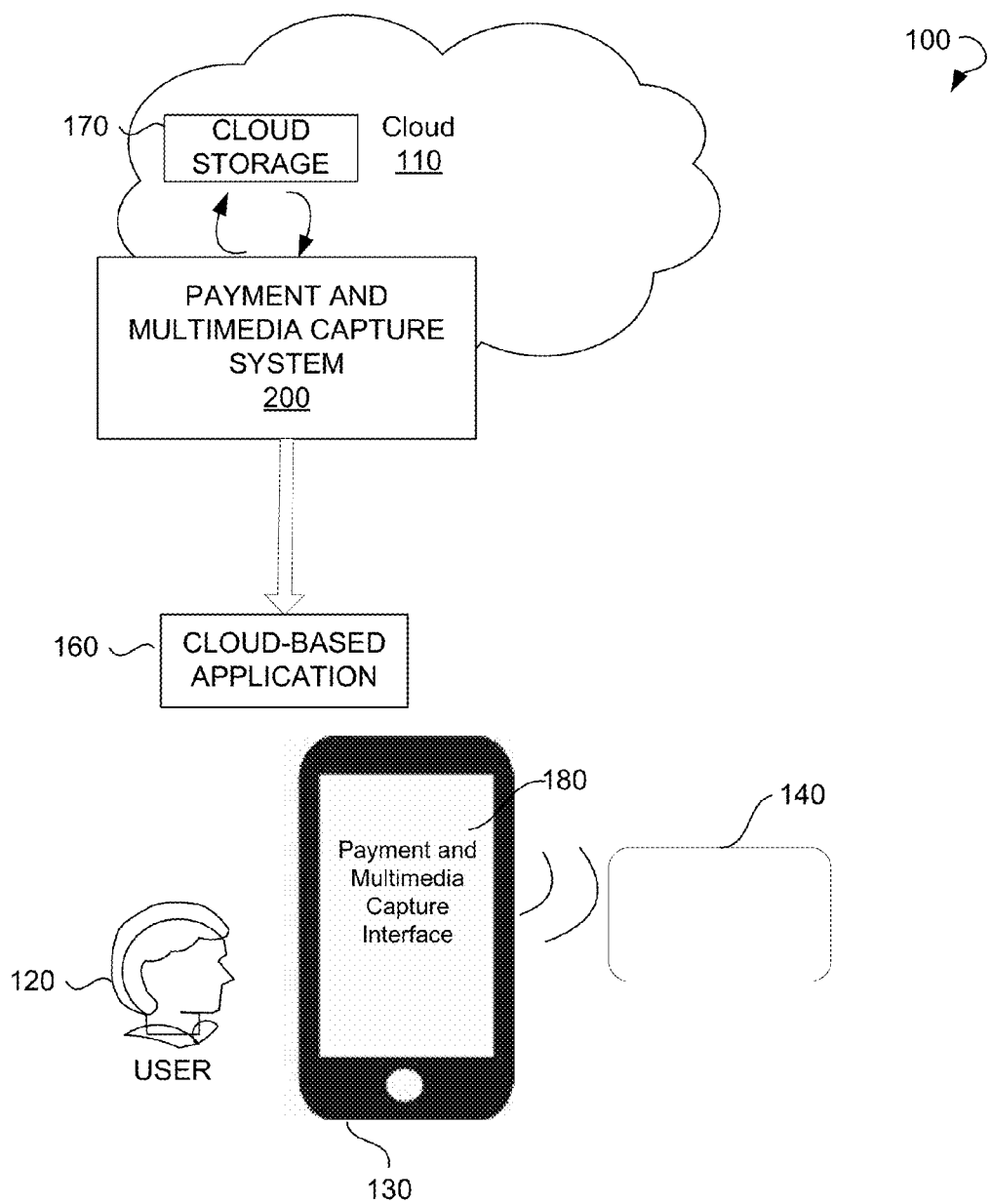
FIG. 1 is a block diagram showing an environment within which a system for payment and multimedia capture via a payment and multimedia capture means can be implemented, in accordance with an example embodiment.

Referring now to the drawings, FIG. 1 illustrates an environment 100 within which a system and a method for payment and multimedia capture via a payment and multimedia capture means can be implemented. The environment 100 may include a user 120, an external device 130, network 110, a payment and multimedia capture system 200. The system 200 may have a distributed architecture including a payment and multimedia capture means 140, a cloud-based application 160, and a cloud storage 170 associated with the user 120. The user 120 may put the payment and multimedia capture means 140 in a proximity of the external device 130 to enable connection between the external device 130 and the payment and multimedia capture means 140. On a user request or without it, connection between the external device 130 and the payment and multimedia capture means 140 may be established. The connection may be established through radio waves, contacts for direct electrical connection, data-strip reading, and so forth. The payment and multimedia capture means 140 may include a radio frequency identification (RFID) chip, a near field communication (NFC) chip, one or more contacts for direct electrical connection, a magnetic data-strip, or holographic data-strip for communication with the external device 130.

The external device 130 may include a smartphone, a wearable device (e.g., augmented reality glasses, smart watch), a tablet computer, a lap top, and so forth. The external device 130 may have an embedded RFID functionality. Alternatively, the external device may be equipped with an RFID reader detachably connected to the external device.

An RFID reader may transmit an encoded radio signal to interrogate the RFID chip. The RFID chip may receive the signal and respond with its identification information and key data associated with the user 120 and prewritten to the RFID chip.

The key data together with identification data of the external device may be used to authenticate to the cloud-based application 160 and activate the cloud-based application 160 on the external device 130. The cloud-based application 160 may be provided on a screen, projected or otherwise displayed by the external device 130 via a web browser or through another way. The cloud-based application 160 may provide to the user 120 a payment and multimedia capture interface 180. The cloud-based application 160 may include a file hosting service, which offers cloud storage, file synchronization, personal cloud, and client software. The cloud-based application 160 may allow users to create a dedicated folder on their client devices, which synchronize with each other so that it appears to be the same folder (with the same contents) regardless of which client device is used to view it. Files placed in the dedicated folder are also accessible via a website and mobile applications. A freemium business model may be used for access, where users are offered a free account with a set storage size and paid subscriptions for accounts with more capacity. Additionally, the cloud-based application 160 may provide file-sharing, collaborating, and other tools for working with files that are uploaded to its servers. Users can determine how their content can be shared with other users, invite others to view and/or edit an account's shared files, upload documents and photos to a shared files folder, and give other users rights to view shared files.

In some embodiments, the cloud-based application 160 includes a media player, multimedia library, online radio broadcaster, and mobile device management application all in one. Thus, the cloud-based application 160 allows users to play, download, and organize digital audio and video as well as other types of multimedia on client devices via computer, internet-connected device, mobile and wearable devices. Additionally, users may send friends and family multimedia content gift cards from client devices. The gift cards can be provided in a range of denominations, and recipients can choose a desired gift, including music membership or another gift from the cloud store. Through the cloud store, users can purchase and download music, music videos, television shows, audio books, pod-casts, movies, and movie rentals, and ring-tones via the cloud-based application 160.

Further, the cloud-based application 160 may be configured to add to, organize and play digital media collection on the client device, as well as synchronize the digital media collection to a portable device.

The payment and multimedia capture interface 180 may include a haptic control configured to sense a haptic input of a user. The haptic control may include, for example, a one-touch button. The haptic input may include a touch of the user 120 to a specific area of the payment and multimedia capture interface 180 associated with the haptic control. In response to user interaction with the haptic control, the cloud-based application 160 may perform an operation, e.g., a payment operation or a multimedia capture operation. When the payment operation is performed, payment details of the user 120 stored in the cloud storage 170 may be transmitted to the external device. The payment details may include data of a credit card, debit card, payment card, banking account, virtual currency account, web purse, or another payment facility of the user. The payment details may be applied to perform a payment, e.g., populate internet payment fields on the external device, transmit payment details to make a NFC payment, an internet payment, a scan code payment, a person-to-person payment, a buyer-to-merchant payment, a peer-to-peer payment, an in-application payment, a point-of-sale payment, a mobile payment, a wearable payment, a one-touch buying, and a digital wallet payment, and so forth. The payment details is stored neither in the external device 130, nor in the cloud storage 170. The payment details is stored in the cloud storage 170 and provided via the cloud-based application 160 only to perform a payment. At least two factors may be used to authenticate to the cloud-based application 160 and receive the payment details. The factors include the key data from the payment and multimedia capture means 140 and identification data of the external device 130. Thus, payment details of the user 120 may be protected from a theft or fraud. The payment and multimedia capture means 140 may be useless without the external device 130 associated with the user 120 and vice versa. Hence unauthorized access to the payment details of the user 120 may be hindered.

Communication between the external device and the cloud 110 may be performed via a network. The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, Global Positioning System (GPS), CDPD (cellular digital packet data), RIM (Research in Motion, Limited) duplex paging network, Bluetooth radio, or an IEEE 802.11-based radio frequency network. The network can further include or interface with any one or more of an RS-232 serial connection, an IEEE-1394 (Firewire) connection, a Fiber Channel connection, an IrDA (infrared) port, a SCSI (Small Computer Systems Interface) connection, a Universal Serial Bus (USB) connection or other wired or wireless, digital or analog interface or connection, mesh or Digi® networking.

Figure 2:
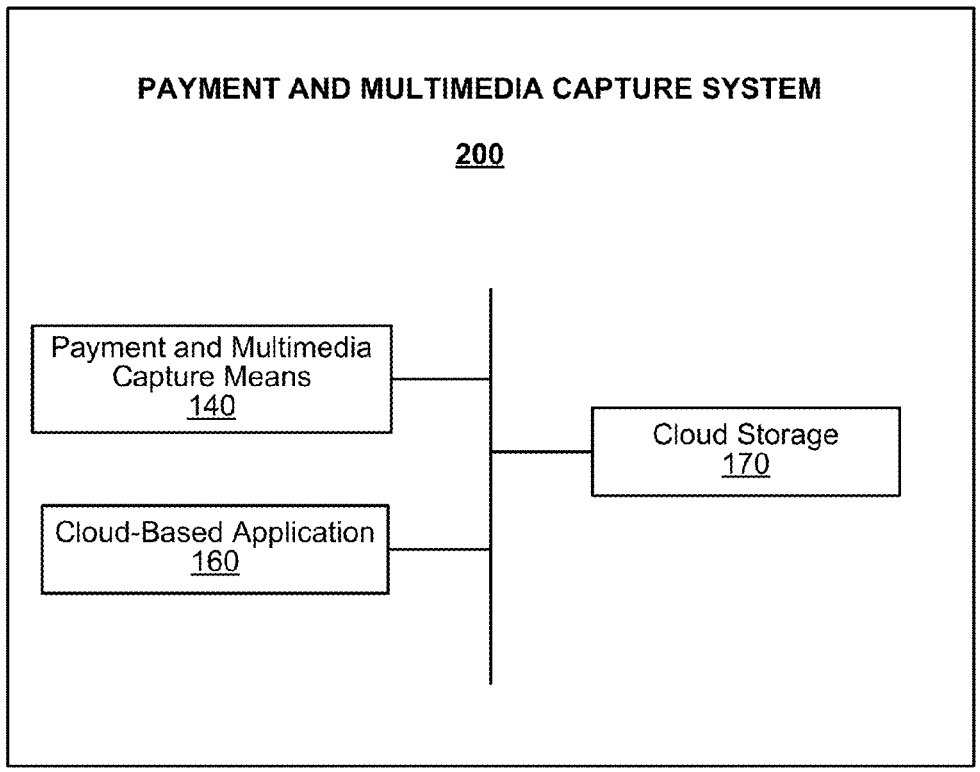
FIG. 2 is a block diagram showing various modules of the system for payment and multimedia capture, in accordance with certain embodiments.

FIG. 2 is a block diagram showing various modules of the payment and multimedia capture system 200, in accordance with certain embodiments. The system 200 may comprise a payment and multimedia capture means 140, a cloud-based application 160, and a cloud storage 170. The payment and multimedia capture means 140 may include a key data storage in a form factor of a credit or debit card. The payment and multimedia capture means 140 may be configured to communicate with an external device and one or more internet-connected devices and transmit key data from the payment and multimedia capture means 140 to the external device. The key data may be stored on RFID chip or another storage means. In various embodiments, the RFID chip may be passive, active, or battery-assisted passive. An active RFID chip may be accompanied by an on-board battery (e.g., a solar charge system, non-contact charging battery, inductive charging battery, and so forth). The active RFID chip may periodically transmit its signal. The battery-assisted passive RFID chip may be accompanied by a micro battery. This type of RFID chip may be activated in the proximity of an RFID reader. The passive RFID chip may have no battery and just respond to a request of the reader using the radio energy transmitted by the reader.

The cloud-based application 160 may reside in a cloud. On receiving key data from the payment and multimedia capture means 140, the cloud-based application 160 may be initiated on the external device and the payment and multimedia capture interface may be provided via a browser or otherwise on a screen, by a projector, as a hologram, and so forth. The payment and multimedia capture interface may include a haptic control configured to sense a haptic input of the user. The haptic input of the user may include a touch or a gesture of the user to the haptic control sensed by one or more sensors of the external device. The haptic input may be analyzed to determine a duration of the haptic input, and based on the duration of the haptic input, select an operation from a list of predetermined operations to be performed by the cloud-based application 160. The predetermined operations may include at least a payment operation and a multimedia capture operation. If the payment operation is selected, the cloud-based application 160 may receive the payment details associated with the user from the cloud storage 170 of the user and apply the payment details to make a payment. If the multimedia capture operation is selected, the cloud-based application 160 may receive multimedia captured by a camera associated with the external device. The cloud storage 170 may include a storage sector provided to the user in a cloud. The cloud storage 170 may be configured to store the payment details and the multimedia associated with the user. Additionally, the cloud storage 170 may provide access to multimedia on a user request, enable downloading, uploading and paying for multimedia data such as audio and video data, text, software, games and other types of digital data via an interface for sending and receiving multimedia data, data memory for storing received multimedia content data, and secured verified payment validation memory for providing payment validation data to an external device. The mobile and wearable devices may store a record of access made to the stored multimedia content, and content use terms and rules for controlling access to the stored content. To reduce the risk of unauthorized access to data over the Internet, access terms and rules in combination with secured payment data and stored content data can be applied.

In some embodiments, the cloud-based application 160 may be provided for purchase in one or more applications stores. The one or more applications stores may be associated with an operating system, such as Microsoft Windows, Linux, Android, Blackberry, iOS, Windows Phone, and so forth. The cloud-based application may be provided in one or more applications stores free of charge or at a predetermined price. In an example embodiment, the cloud-based application 160 may include a one-touch payment and multimedia application.

Figure 3:
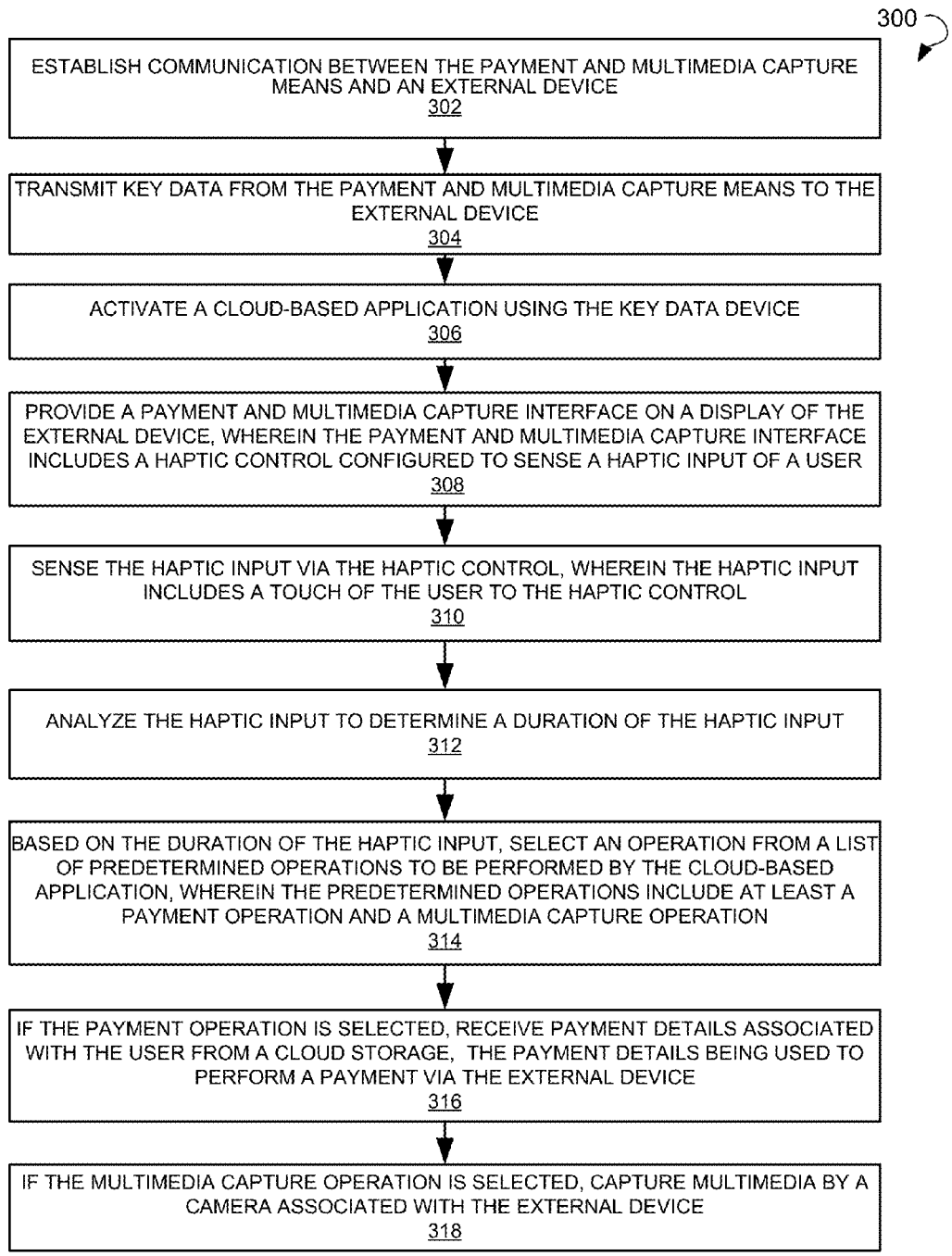
FIG. 3 is a flow chart illustrating a method for payment and multimedia capture via a payment and multimedia capture means, in accordance with certain embodiments.

FIG. 3 is a flow chart illustrating a method 300 for payment, multimedia capture, and encrypting via a payment and multimedia capture means and a one-touch payment and multimedia application associated with a mobile and wearable device, in accordance with some example embodiments. The method 300 may be performed by logic that may comprise hardware (e.g., dedicated logic, programmable logic, and microcode), software (such as software run on a general-purpose computer system or a dedicated machine), or a combination of both. In one example embodiment, the processing logic resides at the payment and multimedia capture system 200, and the various elements of the system 200 can perform the method 300. It will be appreciated by one of ordinary skill that examples of the foregoing modules may be virtual, and instructions said to be executed by a module may, in fact, be retrieved and executed by software. Although various elements may be configured to perform some or all of the various operations described herein, fewer or more elements may be provided and still fall within the scope of various embodiments.

As shown in FIG. 3, the method 300 may commence at operation 302 with establishing communication between the payment and multimedia capture means and an external device, such as one or more internet-connected devices. At operation 304, key data may be transmitted from the payment and multimedia capture means to the external device. The key data may include a code or credentials to authorize access to the cloud-based application and the cloud storage. With the key data, the cloud-based application may be activated by a processor of the external device at operation 306. A payment and multimedia capture interface of the cloud-based application may be provided via the external device at operation 308. The payment and multimedia capture interface may be displayed on a screen of the external device, projected by a projector of the external device on a surface or user eye, projected as a hologram in the field of view of the user. The payment and multimedia capture interface may include a haptic control configured to sense a haptic input of the user. The haptic input may be sensed via the haptic control by one or more sensors associated with the external device at operation 310. The one or more sensors may include a motion sensor, a touch sensor, an infrared sensor, and so forth. The haptic input may include a touch of the user to the haptic control or a gesture of the user in relation to the haptic control. The haptic input may be analyzed to determine a duration of the haptic input at operation 312. Based on the duration of the haptic input, the cloud-based application may select which operation to initiate at operation 314. The operations available may be predetermined in a list of predetermined operations to be performed by the cloud-based application. The predetermined operations may include at least a payment operation and a multimedia capture. If the payment operation is selected, payment details associated with the user may be received from a cloud storage at operation 316. The payment details may be used to perform a payment via the external device. If the multimedia capture operation is selected, multimedia may be captured by a camera associated with the external device at operation 318. The multimedia may include a photo, a video, a text, software, a geographic location, an audio, and so forth. The captured multimedia may be stored to the cloud storage. In example embodiments, the capturing may include grabbing screenshots of posts, such as posts on web-sites and in social media networks. The posts may include links, such as a Shop Now link, a Book Now link, a Download link, a Learn More link, a Sign Up link, a Buy Now link, a Pay Now link, and the like.

In some embodiments, the user may access multimedia on the cloud storage. When an access request is received from the user through the payment and multimedia capture interface, the access to the cloud storage may be granted based on submitting of the key data. The access may be performed via a via Wi-Fi, 3G network, 4G network, 5G network, or 6G network.

In some example embodiments, the cloud storage may be configured to provide an access to downloading, uploading, and paying for the multimedia. Furthermore, the cloud storage may be configured to store the multimedia, a record of an access made to the multimedia, and content use terms and rules for controlling the access to the multimedia. The cloud storage may be further configured to provide payment validation data to an external device.

In some embodiments, the method 300 may further include prompting the user to log into the cloud-based application and provide a consent to initiate payments on behalf of the user. Therefore, upon receiving the consent from the user, all future payments may be initiated automatically without requesting the consent of the user. The access may be performed via initiating one or more of the following: a one-touch payment, a one-scan payment, an NFC payment, a Wi-Fi payment, a beacon payment, a mobile payment, a wearable payment, a one-touch buying, a digital wallet payment, and the like.

In an example embodiment, the cloud-based application may be configured to prompt the user to purchase and download one or more or the following: music, music videos, television shows, audio books, movies, and movie rentals. The cloud-based application may be associated with the mobile and wearable device of the user. In an example embodiment, the cloud-based multimedia may be coupled to a payment processor.

The method 300 may further include selecting the haptic control for a particular type of multimedia content to be captured to provide captured multimedia and analyzing data associated with the haptic control. Based on the analysis, one or more multimedia types may be selected for recording from the captured multimedia based on predetermined rules associated with a predetermined time of the providing the haptic control by the user.

In further embodiments, the method 300 may include sending a command to a sensor of the mobile and wearable device to capture multimedia to memory of the selected multimedia type based on the predetermined rules. The user may touch a Buy Now link or a Pay Now link. An encryption unit may be operable to encrypt the payment with one or more of the recorded multimedia types to prepare the one or more multimedia types for activating. The method 300 may continue with storing the one or more multimedia types in a memory.

The method 300 may further include providing the payment and multimedia capture interface for selection of an activity operation. The activity operation may include a messaging operation, a calling operation, and the one-touch payment operation. The selection of the activity operation may be received via the payment and multimedia capture interface of the user. If the one-touch payment operation is selected, a payment request may be transmitted to a financial organization. The payment request may be generated using data of an actual page on the mobile and wearable device.

The method 300 may further include encrypting the payment request associated with the one-touch payment operation to obtain an encrypted payment request. The encrypted payment request may be decrypted by a one-touch payment and multimedia application of a mobile and wearable device of a recipient. Additionally, the encrypted payment request may be removed from the mobile and wearable device of the recipient after the encrypted payment request is optically read. The one-touch payment and multimedia application may be associated with an application protocol integrated into a communication platform.

The method 300 may further include receiving, from the user, a registration request to register the user in a mobile payment service. The user may send the registration request via the cloud-based application associated with the mobile and wearable device. The cloud-based application being associated with providing a free Voice over Internet Protocol service and a free Over-the-Top service.

The method 300 may include securing the mobile and wearable device via a band to a part of a human body. The part of the human body including a wrist, an arm, a neck, a bead, a leg, a waist, an ear, and a finger. The method 300 may include securing, via the band, the mobile and wearable device under, within or on clothing, operably connecting a database to the mobile and wearable device.

The database may store financial information of the user providing during user registration. The receiving of the selection of the activity operation may include a voice command, a haptic interaction with a touchscreen of the mobile and wearable device, and a move command.

The mobile and wearable device may comprise one or more haptic control elements to control operation or functions of the mobile and wearable device, and controlling access to the mobile and wearable device may be performed by one or more of the following: a password, a Personal Identification Number code, and biometric authorization. The biometric authorization may include fingerprint scanning, palm scanning, face scanning, and retina scanning. The scanning may be performed using the one or more biometric sensors. The one or more biometric sensors may include sensors for sensing a command for the one-touch payment operation, the sensing shown on the display. The mobile and wearable device may further comprise a fingerprint reader configured to scan a fingerprint. The scanned fingerprint may be matched to one or more approved fingerprints. Access to the mobile and mobile and wearable device may be granted based on the matching.

Furthermore, the mobile and wearable device may further comprise a camera configured to capture one or more codes. The one or more codes may include electronic key data, a link to a web-resource, a payment request, and advertising information. The one or more codes may include barcode, a linear dimensional code, a two-dimensional code, a snap tag code, and a QR code.

Moreover, the mobile and wearable device may obtain information about a payment system of the user. The mobile and wearable device may generate and display a barcode that encodes user payment information. The barcode may be scanned and processed at a checkout counter to retrieve the user payment information from a database of a payment processing system. The user payment information may be used to transfer funds between the user and the service provider. The recipient may include a merchant or multimedia provider.

The method 300 may further include associating the mobile and wearable device with an electronic payment card configured to act as one or more of a smart card, a proximity card, an integrated circuit card, a magnetic strip card, a Europay, MasterCard, and Visa (EMV) smart payment card, and an electronic payment card. The electronic payment card may store card data of one or more of debit cards, credit cards, gift cards, loyalty cards, prepaid cards, bank cards, identity cards, and membership cards. The electronic payment card may be configured to attach to the mobile and wearable device.

The method 300 may further include scanning the one or more codes. The one or more codes may be present on a one-touch Quick Response (QR) code invoice. The one-touch QR code invoice may store one or more of invoice data, monetary amount summary, product data, service data, merchant data, invoice number, and amount to be paid. The one-touch QR code invoice may be associated with one or more of an invoice, a credit note, a debit note, a pro forma invoice, and an advance invoice; and The method 300 may further include storing information associated with the one-touch payment in the mobile and wearable device associated with the user. The user may activate the one-touch payment operation by holding the mobile and wearable device near a contactless reader card activating a one-touch payment icon on the mobile and wearable device and may make a secure payment, authorized in part when a location of the payment matches with a determined location of the mobile and wearable device.

Figure 4:
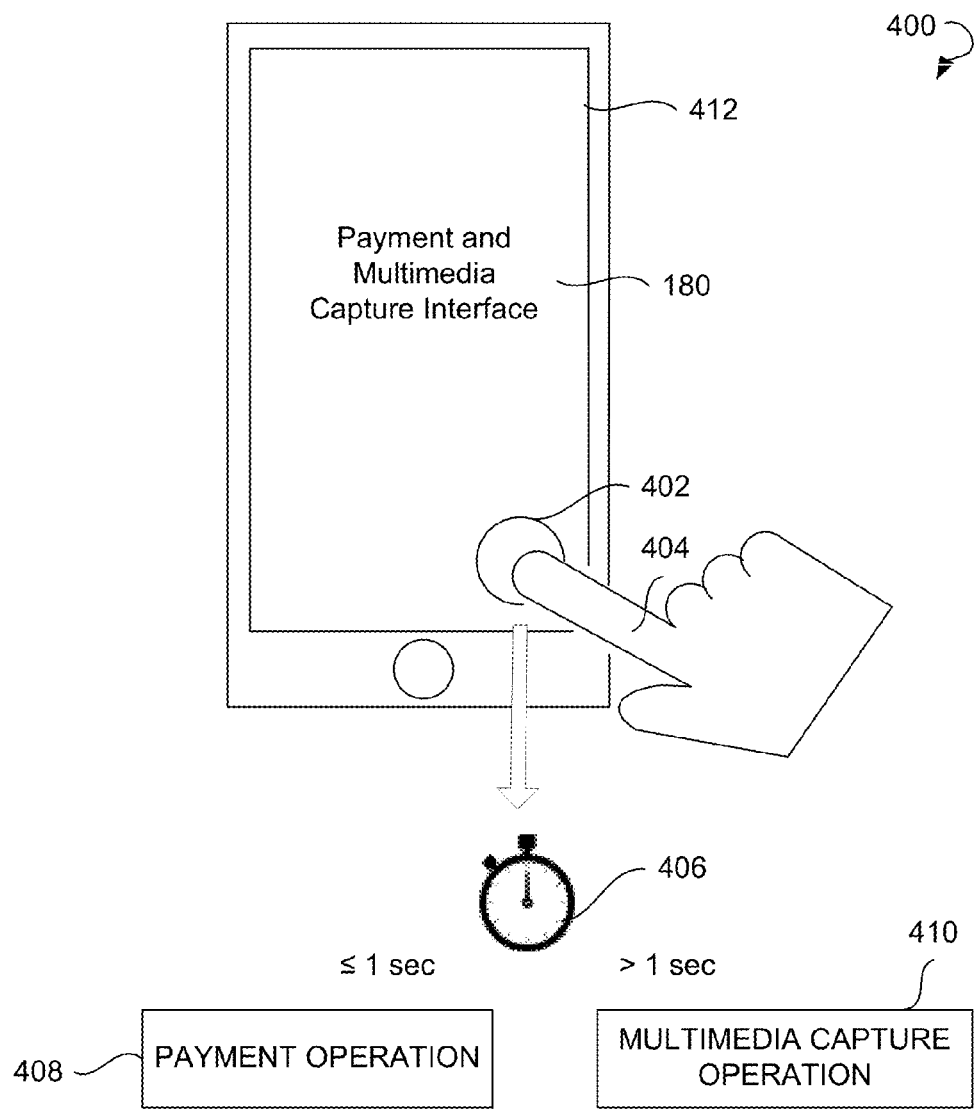
FIG. 4 is a block diagram illustrating a haptic input via a haptic control, in accordance with certain embodiments.

FIG. 4 is a block diagram 400 illustrating a haptic input via a haptic control, in accordance with certain embodiments. The haptic control 402 may be provided with the payment and multimedia capture interface 180 shown on the display 412 of the external device. A user may give a haptic command by touching the haptic control 402 with his finger 404. A duration 406 of the haptic input may be determined. Based on the duration an operation to be performed may be selected. For example, if the duration is one second or less, a payment operation 408 may be selected and performed. If the duration is more than 1 second, a multimedia capture operation 410 may be selected and performed.

Figure 5:
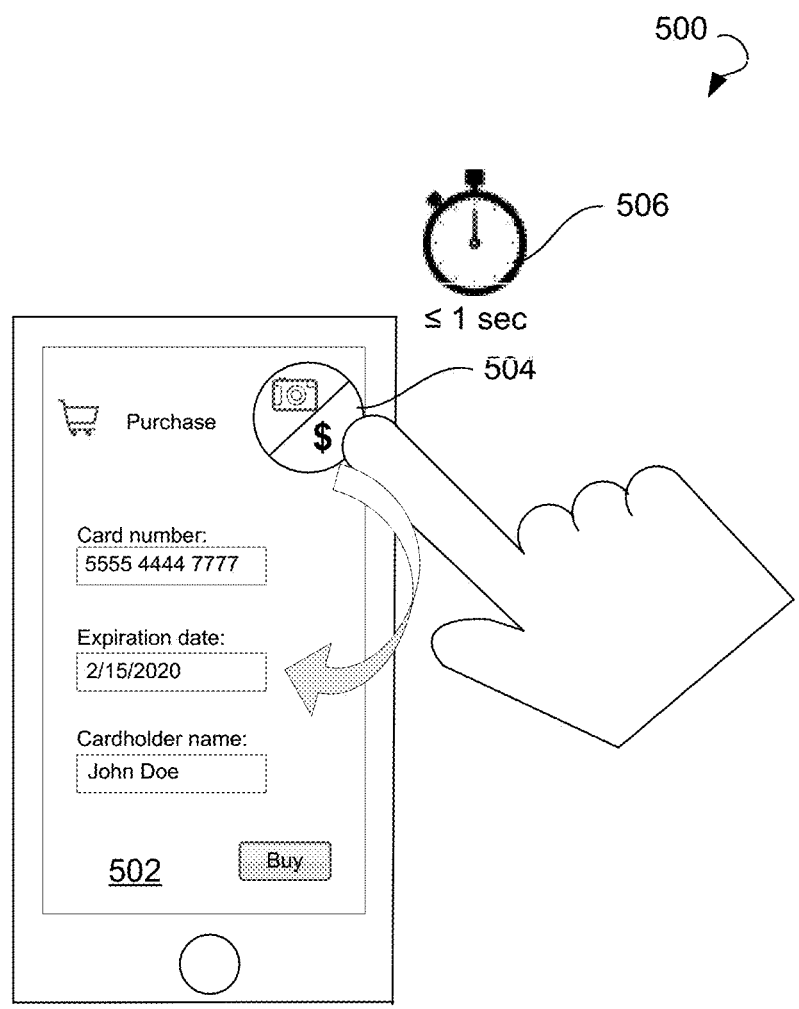
FIG. 5 is a block diagram illustrating a payment operation using the system for payment and multimedia capture, in accordance with certain embodiments.

FIG. 5 is a block diagram illustrating a payment operation using the system for payment and multimedia capture, in accordance with certain embodiments. The haptic input of the user via the haptic control 504 is interpreted as a request to perform the payment operation according to the duration 506 of the input. Payment details of the user may be received from the cloud storage and populated into internet payment page 502 to facilitate the payment. Thus, the payment details may be automatically provided and the payment may be facilitated.

In an alternative embodiment, the payment may be performed through NFC. For example, when the payment operation is selected, the payment details may be received and automatically transmitted via NFC. When a user waves the external device near a radar module, a payment is made.

In some embodiment, based on the payment performed via the payment and multimedia capture system, bonus points may be provided to the user. The bonus points may be redeemed for expenses, transferred to miles for free flight tickets or free hotel nights.

Thus, the payment and multimedia capture system enables one-touch payments and one-touch buying using mobile and wearable devices at contactless points of sale and via mobile applications. The payment and multimedia capture system digitizes and replaces the credit or debit card transactions at point-of-sale terminals with the addition of two-factor authentication. The payment and multimedia capture system allows mobile and wearable devices wirelessly communicate with point of sale systems using an NFC antenna and/or a "dedicated chip that stores encrypted payment information".

To pay at points of sale, a user may authenticate by holding his fingerprint to the sensor of a client device and choose one touch payment as a payment method. Users can store information of their payment cards in the payment and multimedia capture system by taking a photo of the payment card or by entering the card information manually.

Figure 6:
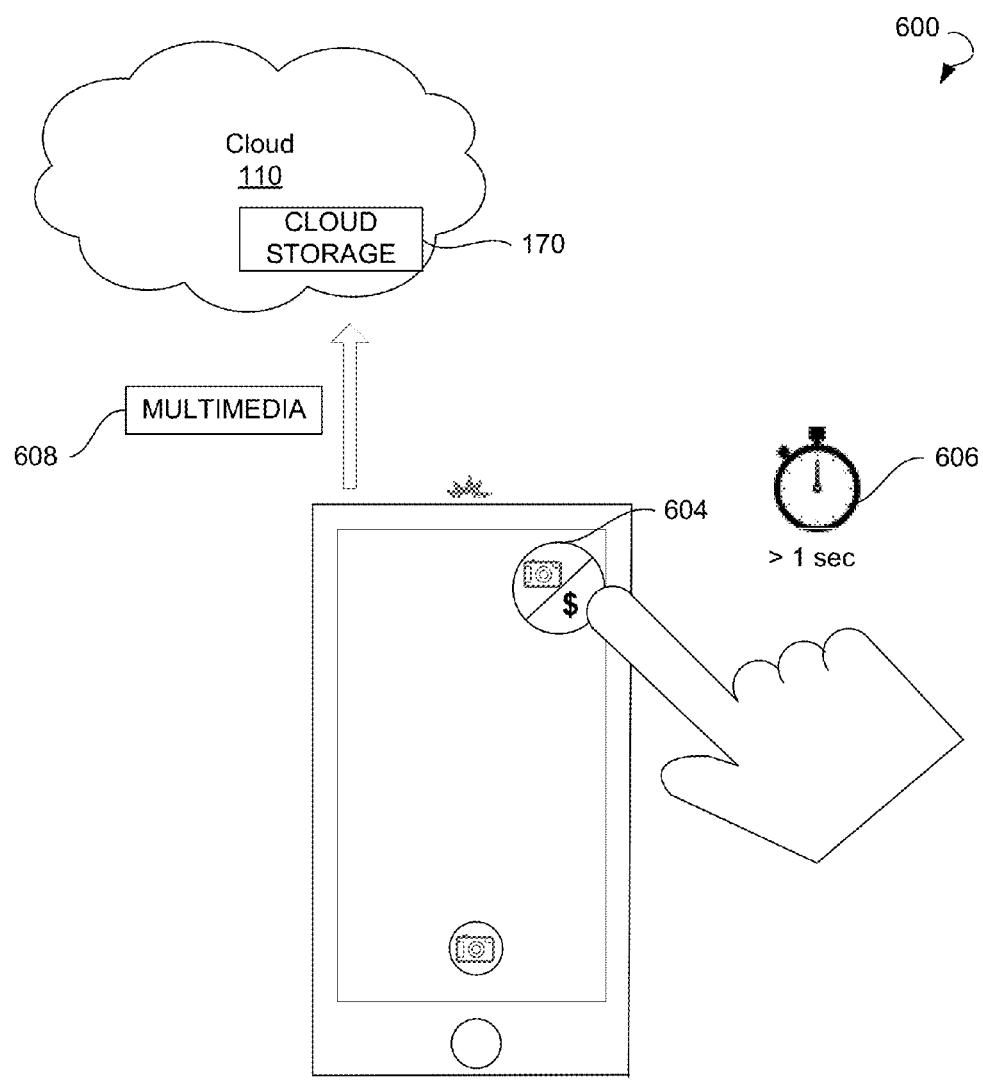
FIG. 6 is a block diagram illustrating a multimedia capturing operation using the system for payment and multimedia capture, in accordance with certain embodiments.

FIG. 6 is a block diagram illustrating a multimedia capturing operation using the system for payment and multimedia capture, in accordance with certain embodiments. The haptic input of the user via the haptic control 604 may be interpreted as a request to perform the multimedia capture operation according to the duration 606 of the input. A camera of the external device may be activated and multimedia 602 may be captured. The captured multimedia 608 may be transmitted and stored to the cloud storage 170 in the cloud 110.

Figure 7:
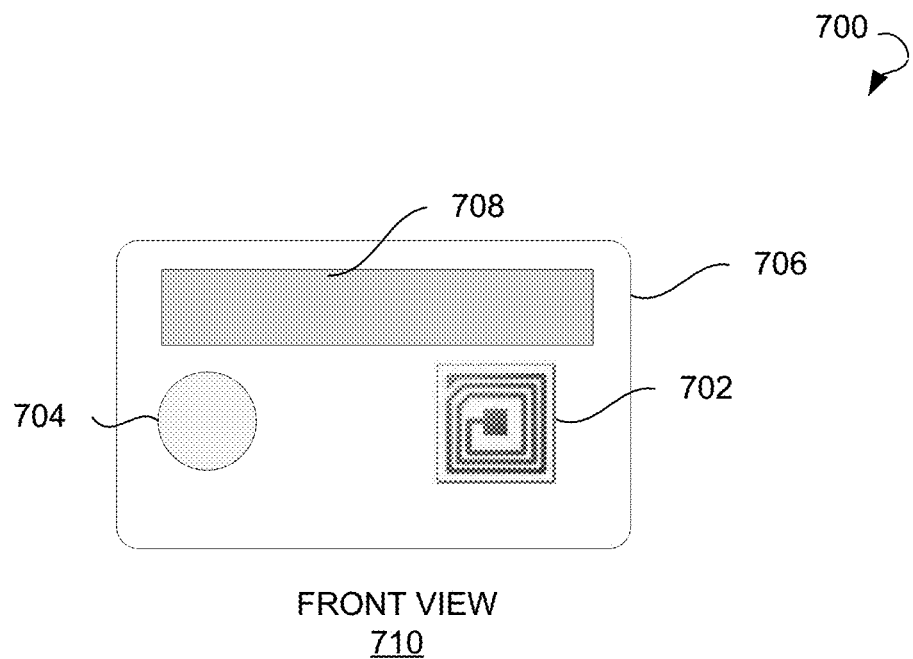
FIG. 7 is a block diagram illustrating a payment and multimedia capture means, in accordance with certain embodiments.
Figure 7:
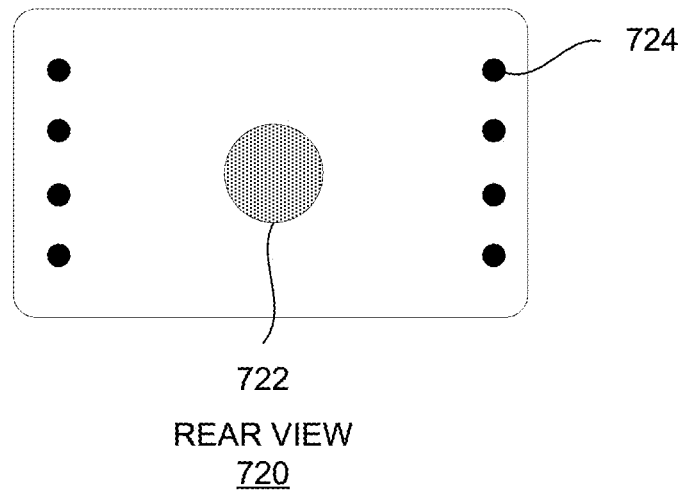

FIG. 7 is a block diagram illustrating an example payment and multimedia capture means 700, in accordance with certain embodiments. A front view 710 of the example payment and multimedia capture means 700 shows a communication unit 702 (e.g., an RFID chip) attached to a body 706 made of plastic or another material. The communication unit 702 may store the key data and establish connection with the external device. Additionally, the example payment and multimedia capture means 700 may include a GPS tracking unit 704 attached to the body 706 and configured to track geographic position of the payment and multimedia capture means 700 and transmit the geographic position in response to a request from the external device. In some embodiments, the payment and multimedia capture means 700 may include a battery 708 attached to the body 706 and electrically connected to one or more of the communication unit 702, GPS tracking unit 704, and other elements. The battery may include a solar changing unit, a non-contact charging battery, and so forth.

In further embodiments, the payment and multimedia capture means 700 may further include an interface for enabling sending the multimedia and receiving the multimedia. Furthermore, the payment and multimedia capture means 700 may be configured to provide making payments at contactless points of sale by digitizing and replacing the payment details associated with one or more of a credit card transaction, a debit card transaction and a magnetic stripe transaction with the addition of two-factor authentication.

The rear view 720 shows a lighting alarm unit 724 attached to the body 706 and configured to emit light in response to a search command from the external device. The lighting alarm unit 724 may include one or more light emitting diodes electrically connected to the battery 708. Additionally, the rear view 720 shows a sound alarm unit attached to the body 706 and configured to produce sound in response to a search command from the external device.

In an example embodiments, a method for reducing the cost of sending multimedia over an intermittent network, and internet-connected computing devices via multiple communication channels may be provided. The method may include creating a first multimedia content on a first device or server. The multimedia may be intended to be sent to a second device or server over the network multiple communication channels. A first policy may be applied to reduce the cost of sending multimedia over the intermittent network, and internet-connected computing devices. The first policy may contain one or more rules to determine whether to send the first content to the second device, each rule being a function of one or more multimedia attributes of multimedia, channels or the system environment. The method may further include dynamically updating the first policy by sending a second multimedia to the first device. The second multimedia may be a system multimedia that results in the addition, deletion or other modification of the rules contained in the policy to reduce the cost of sending multimedia over the intermittent network, and internet-connected computing devices. A first content transaction and payment transaction information may be created on the first device. The first transaction may include one or more multimedia intended to be exchanged with the second device over the intermittent network, and internet-connected cooper devices. The first device may be a server device and the second device may be a wireless/mobile and wearable devices. The first transaction may be achieved between the wireless/mobile and wearable device and the server by breaking up a transmission such that the wireless/mobile and wearable device does not have to wait until the first transaction is completed before relinquishing network connection with asynchronous multimedia.

In another embodiment, a multimedia data access terminal for retrieving content data from a multimedia data supplier and providing the retrieved content data to an internet-connected data device may be provided. In some embodiments, the terminal may be included into the payment and multimedia capture means. The terminal may include a first touch interface for communicating with the multimedia data supplier; a multimedia data device touch interface for interfacing with the multimedia data device; a program store platform storing code files implementable by a processor; and a processor, coupled to the first touch screen interface, to the multimedia data device interface and to the program store platform for implementing the stored code files. The code may include code files to read a payment data from the multimedia data device and to forward the payment data to a payment financial validation system; code files to receive payment financial validation data from the payment financial validation system; and code files responsive to the payment financial validation data to retrieve the data from the multimedia supplier and to write the retrieved multimedia data into the data device.

Thus, various systems and methods for payment and multimedia capture have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A method for payment, multimedia capture and encrypting via a payment and multimedia capture means and a payment and multimedia application associated with a mobile and wearable device, the method comprising:
   establishing, by a communication unit, communication between the payment and multimedia capture means and an mobile and wearable device associated with a user;
   transmitting key data from the payment and multimedia capture means to the mobile and wearable device, the key data including at least user credentials;
   activating, by a processor of the mobile and wearable device, a cloud-based application using the key data, the cloud-based application running on the mobile and wearable device and being associated with a cloud storage, wherein the cloud-based application is related to one or more dedicated folders provided on one or more client devices associated with the user, the one or more dedicated folders synchronizing across the one or more client devices, and contents of the one or more dedicated folders being accessible via a web resource and the cloud-based application, the cloud-based application including the payment and multimedia application, wherein the payment and multimedia application is associated with an application protocol, the application protocol being integrated into a communication platform;
   wherein the cloud-based application includes one or more of the following: a media player, a multimedia library, an online radio broadcaster, an online store selling software applications for the mobile and wearable device, and a mobile and wearable device management application to play, download, purchase, organize multimedia, send multimedia gift cards, and synchronize multimedia with a portable device and one or more internet-connected devices, wherein the cloud-based application is configured to prompt the user to purchase and download one or more or the following: music, music videos, television shows, audio books, movies, and movie rentals, and wherein the cloud-based application is associated with the mobile and wearable device of the user;
   receiving, from the user, a registration request to register the user in a mobile payment service, wherein the user sends the registration request via the cloud-based application associated with the mobile and wearable device, the cloud-based application being associated with providing a free Voice over Internet Protocol service and a free Over-the-Top service;
   securing the mobile and wearable device via a band to a part of a human body, the part of the human body including one or more of the following: a wrist, an arm, a neck, a bead, a leg, a waist, an ear, and a finger, securing, via the band, the mobile and wearable device being secured under, within or on clothing;
   operably connecting a database to the mobile and wearable device, wherein the database is configured to store financial information of the user provided during the registering of the user;
   associating the mobile and wearable device with an electronic payment card configured to act as one or more of a smart card, a proximity card, an integrated circuit card, a magnetic strip card, a Europay, MasterCard, and Visa (EMV) smart payment card, and an electronic payment card, the electronic payment card storing card data of one or more of debit cards, credit cards, gift cards, loyalty cards, prepaid cards, bank cards, identity cards, and membership cards, wherein the mobile and wearable device is equipped with an integrated smartcard, wherein the user waves the mobile and wearable device near a reader module to make a payment to the reader module;
   providing, by the processor of the mobile and wearable device, a payment and multimedia capture interface on a display of the mobile and wearable device, wherein the payment and multimedia capture interface includes a haptic control configured to sense a haptic input of the user, wherein the payment and multimedia capture interface is further configured to receive a selection of an activity operation, wherein the activity operation includes one or more of the following: a messaging operation and a calling operation, wherein the receiving of the selection of the activity operation includes one or more of the following: a voice command, a haptic interaction with a touchscreen of the mobile and wearable device, and a move command;
   sensing the haptic input via the haptic control, wherein the haptic input includes a touch of the user to the haptic control;
   analyzing the haptic input to determine a duration of the haptic input;
   based on the duration of the haptic input, selecting an operation from a list of predetermined operations to be performed by the cloud-based application, wherein the predetermined operations include at least a payment operation and a multimedia capture operation, wherein the mobile and wearable device is operable to perform both the payment operation and the multimedia capture operation, wherein the payment operation is associated with a payment request of the user;
   in response to the multimedia capture operation being selected:
      capturing multimedia by a camera of the mobile and wearable device, the multimedia being stored to the cloud storage, wherein the multimedia includes a photo, a video, and a geographic location, and wherein the capturing includes grabbing screenshots off the mobile and wearable device, the screenshots including links including one or more of the following: a Shop Now Link, a Book Now Link, a Download link, a Learn More link, a Buy Now link, the Pay Now link, and a Sign Up link;
      selecting the haptic control for a particular type of multimedia content to be captured to provide captured multimedia;
      analyzing data associated with the haptic control;
      based on the analyzing, selecting one or more multimedia types for recording from the captured multimedia based on predetermined rules associated with a predetermined time of the providing the haptic control by the user;

sending a command to a sensor of the mobile and wearable device to capture multimedia of the selected one or more multimedia types based on the predetermined rules;

storing the one or more multimedia types in a memory, wherein the cloud-based application is coupled to a payment processor;

in response to the payment operation being selected:
receiving payment details associated with the user from the cloud storage, the payment details being used to perform a payment via the mobile and wearable device;

encrypting the payment request associated with the payment operation to obtain an encrypted payment request, wherein the encrypted payment request is decrypted by a further payment and multimedia application associated with a mobile and wearable device of a recipient, wherein the encrypted payment request is removed from the mobile and wearable device of the recipient after the encrypted payment request is optically read;

transmitting the encrypted payment request to a financial organization; and storing information associated with the payment in the mobile and wearable device associated with the user, wherein the payment operation is authorized in part when a geographic location determined by the mobile and wearable device matches a geographic location of a merchant at a time of the selecting of the payment operation;

wherein the mobile and wearable device is operable to obtain information about a payment system of the user, wherein the mobile and wearable device is operable to generate and display a barcode that encodes user payment information, the barcode being scanned and processed at a checkout counter to retrieve the user payment information from a database of a payment processing system, payment information being used to transfer funds between the user and a service provider for an amount of the payment, wherein the service provider includes a merchant or a multimedia provider; and wherein the service provider provides the user with a compensation for future purchases made via the mobile payment service, the compensation being equal to the amount of the payment;

wherein the mobile and wearable device comprises one or more haptic control elements to control operation or functions of the mobile and wearable device, and controlling access to the mobile and wearable device is performed by one or more of the following: a password, a Personal Identification Number code, and biometric authorization, the biometric authorization including fingerprint scanning, palm scanning, face scanning, and retina scanning, wherein the scanning is performed using one or more biometric sensors, wherein the one or more biometric sensors include sensors for sensing a command for the payment operation to perform buying, the sensing shown on the display, the mobile and wearable device further comprising a fingerprint reader configured to scan a fingerprint, the scanned fingerprint being matched to one or more approved fingerprints, wherein access to the mobile and wearable personal is granted based on the matching; and wherein the camera of the mobile and wearable device is further configured to capture one or more codes, the one or more codes including the key data, a link to a web- resource, a payment request, and advertising information, wherein the one or more codes include one or more of the following: the barcode, a linear dimensional code, a two-dimensional code, a snap tag code, and a QR code.

2. The method of claim 1, wherein the communication is established via one or more of the following: radio waves, contacts for direct electrical connection, magnetic data-strip, and holographic data-strip.

3. The method of claim 1, wherein the payment details include a data related to one or more of the following: a banking account associated with the user, a payment card associated with the user, and a virtual money account of the user.

4. The method of claim 1, wherein the payment includes an internet payment, a near field communication (NFC) payment, a scan code payment, a person-to-person payment, a buyer-to-merchant payment, a peer-to-peer payment, an in-application payment, a point-of-sale payment, a mobile payment, a wearable payment, and a digital wallet payment.

5. The method of claim 1, wherein the payment is associated with bonus points provided to the user.

6. The method of claim 1, further comprising:
receiving, from the user through the payment and multimedia capture interface, an access request; and
providing, through the cloud-based application, access to the cloud storage, wherein the access is granted based on submitting of the key data.

7. The method of claim 6, further comprising:
prompting the user to log into the cloud-based application and provide a consent to initiate payments on behalf of the user, wherein upon the consent the payments are initiated automatically without requesting the consent of the user, wherein the access is performed via initiating one or more of the following: an NFC payment, a Wi-Fi payment, a beacon payment, a mobile payment, a one- touch buying, a wearable payment, a digital wallet payment.

8. The method of claim 1, wherein the cloud storage is further configured to:
receive an access request and provide access to the multimedia, wherein the access is granted based on receiving of the key data;
provide an access to downloading, uploading, buying, and paying for the multimedia;
store the multimedia, a record of an access made to the multimedia, and content use terms and rules for controlling the access to the multimedia; and
provide payment validation data to the mobile and wearable device and one or more internet-connected devices.

9. The method of claim 8, wherein the access is performed via a via Wi-Fi, 3G network, 4G network, 5G network, or 6G network.

10. The method of claim 1, wherein the cloud-based application resides in a cloud and is provided on the mobile and wearable device via a web browser, a projector, or a hologram,
wherein the cloud-based application is provided for purchase in one or more applications stores, the one or more applications stores being associated with an operating system, the operating system including one of the following: Microsoft Windows, Linux, Android, Blackberry, iOS, and Windows Phone, and
wherein the cloud-based application is provided free of charge or at a predetermined price.

11. A payment and multimedia capture system comprising:
a payment and multimedia capture means configured to:
communicate with a mobile and wearable device associated with a user, wherein the mobile and wearable device is secured via a band to a part of a human body of the user at one or more of a wrist, an arm, a neck, a head, a leg, a waist, an ear, and a finger under, within, or on clothing of the user;
transmit key data from the payment and multimedia capture means to the mobile and wearable device, the key data including at least user credentials;
a cloud-based application activated using the key data by a processor of the mobile and wearable device, wherein the cloud based application runs on the mobile and wearable device and is associated with a cloud storage, the cloud-based application being related to one or more dedicated folderes provided on one or more client devices associated with the user, the one or more dedicated folders synchronizing across the one or more client devices, and contents of the one or more dedicated folders being accessible via a web resource and the cloud-based application, wherein the payment and multimedia capture means is associated with an application protocol, the application protocol being integrated into a communication platform, the cloud based application being configured to:
receive the key data from the mobile and wearable device, wherein the key data is used to authorize with the cloud-based application, wherein the cloud-based application includes one or more of the following: a media player, a multimedia library, an online radio broadcaster, an online store selling software applications for the mobile and wearable device, and a mobile and wearable device management application to play, download, purchase, organize multimedia, send multimedia gift cards, and synchronize multimedia with a portable device and one or more internet-connected devices, wherein the cloud-based application is configured to prompt the user to purchase and download one or more or the following: music, music videos, television shows, audio books, movies, and movie rentals, and wherein the cloud-based application is associated with the mobile and wearable device of the user, the mobile and wearable device being associated with an electronic payment card configured to act as one or more of a smart card, a proximity card, an integrated circuit card, a magnetic strip card, a Europay, MasterCard, and Visa (EMV) smart payment card, and an electronic payment card, the electronic payment card storing card data of one or more of debit cards, credit cards, gift cards, loyalty cards, prepaid cards, bank cards, identity cards, and membership cards, wherein the mobile and wearable device is equipped with an integrated smartcard, wherein the user waves the mobile and wearable device near a reader module to make a payment to the reader module;
receive, from the user, a registration request to register the user in a mobile payment service, wherein the user sends the registration request via the cloud-based application associated with the mobile and wearable device, the cloud-based application being associated with providing a free Voice over Internet Protocol service and a free Over-the-Top service, and operably connecting a database to the mobile and wearable device, wherein the database is configured to store financial information of the user provided during the registration of the user;
provide a payment and multimedia capture interface on a display of the mobile and wearable device, wherein the payment and multimedia capture interface includes a haptic control configured to sense a haptic input of a user, wherein the payment and multimedia capture interface is further configured to receive a selection of an activity operation, wherein the activity operation includes one or more of the following: a messaging operation and a calling operation, wherein the receiving of the selection of the activity operation includes a voice command, a haptic interaction with a touchscreen of the mobile and wearable device, and a move command;
receive data on the haptic input via the haptic control, wherein the haptic input includes a touch of the user to the haptic control sensed by one or more sensors of the mobile and wearable device;
analyze the haptic input to determine a duration of the haptic input;
based on the duration of the haptic input, select an operation from a list of predetermined operations to be performed by the cloud-based application, wherein the predetermined operations include at least a payment operation and a multimedia capture operation, wherein the mobile and wearable device is operable to perform both the payment operation and the multimedia capture operation, wherein the payment operation is associated with a payment request of the user;
in response to the multimedia capture operation being selected:
capture multimedia by a camera of the mobile and wearable device, the multimedia being stored to the cloud storage, wherein the multimedia includes a photo, a video, and a geographic location, and wherein the capturing includes grabbing screenshots off the mobile and wearable device, the screenshots including links including one or more of the following: a Shop Now Link, a Book Now Link, a Download link, a Learn More link, a Buy Now link, the Pay Now link, and a Sign Up link;
select the haptic control for a particular type of multimedia content to be captured to provide captured multimedia;
analyze data associated with the haptic control;
based on the analyzing, select one or more multimedia types for recording from the captured multimedia based on predetermined rules associated with a predetermined time of the providing the haptic control by the user;
send a command to a sensor of the mobile and wearable device to capture multimedia to memory of the selected multimedia type based on the predetermined rules;
store the one or more multimedia types in a memory, wherein the cloud-based application is coupled to a payment processor;
in response to the payment operation being selected:
receive payment details associated with the user from the cloud storage, the payment details being used to perform a payment via the mobile and wearable device;
encrypt the payment request associated with the payment operation to obtain an encrypted payment request, wherein the encrypted payment request is decrypted by a further payment and multimedia application associated with a mobile and wearable device of a recipient, wherein the encrypted payment request is removed from the mobile and wearable device of the recipient after the encrypted payment request is optically read;

transmit the encrypted payment request to a financial organization; and store information associated with the payment in the mobile and wearable device associated with the user, wherein the payment operation is authorized in part when a geographic location determined by the mobile and wearable device matches a geographic location of a merchant at a time of the selecting of the payment operation;

wherein the mobile and wearable device is operable to obtain information about a payment system of the user, wherein the mobile and wearable device is operable to generate and display a barcode that encodes user payment information, the barcode being scanned and processed at a checkout counter to retrieve the user payment information from a database of a payment processing system, the user payment information being used to transfer funds between the user and a service provider for an amount of the payment, wherein the service provider includes a merchant or a multimedia provider, and wherein the service provider provides the user with a compensation for future purchases made via the mobile payment service, the compensation being equal to the amount of the payment;

wherein the mobile and wearable device comprises one or more haptic control elements to control operation or functions of the mobile and wearable device, and controlling access to the mobile and wearable device is performed by one or more of the following: a password, a Personal Identification Number code, and biometric authorization, the biometric authorization including fingerprint scanning, palm scanning, face scanning, and retina scanning, wherein the scanning is performed using one or more biometric sensors, wherein the one or more biometric sensors include sensors for sensing a command for the payment operation to perform buying, the sensing shown on the display, the mobile and wearable device further comprising a fingerprint reader configured to scan a fingerprint, the scanned fingerprint being matched to one or more approved fingerprints, wherein access to the mobile and wearable personal is granted based on the matching; and wherein the camera of the mobile and wearable device is further configured to capture one or more codes, the one or more codes including the key data, a link to a web-resource, a payment request, and advertising information, wherein the one or more codes include barcode, a linear dimensional code, a two-dimensional code, a snap tag code, and a QR code;

the cloud storage configured to:

store the payment details and the multimedia associated with the user.

12. The system of claim 11, wherein the payment and multimedia capture means includes:

a communication unit configured to establish communication with the mobile and wearable device via one or more of the following: radio waves, direct electrical connection, magnetic data reading, and holographic data reading; and an interface for sending the multimedia and receiving the multimedia; and wherein the payment and multimedia capture means is configured to provide making payments at contactless points of sale by digitizing and replacing the payment details associated with one or more of a credit card transaction, a debit card transaction and a magnetic stripe transaction with addition of two-factor authentication.

13. The system of claim 12, wherein the communication unit includes one or more of the following: a radio frequency identification (RFID) chip, an NFC chip, one or more contacts for direct electrical connection a magnetic data-strip, and holographic data-strip.

14. The system of claim 11, wherein the payment details include a data related to one or more of the following: a banking account associated with the user, a payment card associated with the user, and a virtual money account of the user.

15. The system of claim 11, wherein the payment includes an internet payment, an NFC payment, a point-of-sale payment, and a mobile application payment.

16. The system of claim 11, wherein the multimedia includes a photo, a video, an audio, a text, software, and a geographic location.

17. A non-transitory computer-readable medium having embodied thereon a program being executable by at least one processor to perform a method for payment, multimedia capture and encrypting via a payment and multimedia capture means and a payment and multimedia application associated with a mobile and wearable device, the method comprising:

establishing, by a communication unit, communication between the payment and multimedia capture means and the mobile and wearable device associated with a user;

transmitting key data from the payment and multimedia capture means to the mobile and wearable device, the key data including at least user credentials;

activating, by a processor of the mobile and wearable device, a cloud-based application using the key data, the cloud-based application running on the mobile and wearable device and being associated with a cloud storage, wherein the cloud-based application is related to one or more dedicated folders provided on one or more client devices associated with the user, the one or more dedicated folders synchronizing across the one or more client devices, and contents of the one or more dedicated folders being accessible via a web resource and the cloud-based application, the cloud-based application including the payment and multimedia application, wherein the payment and multimedia application is associated with an application protocol, the application protocol being integrated into a communication platform;

wherein the cloud-based application includes one or more of the following: a media player, a multimedia library, an online radio broadcaster, an online store selling software applications for the mobile and wearable device, and a mobile and wearable device management application to play, download, purchase, organize multimedia, send multimedia gift cards, and synchronize multimedia with a portable device and one or more internet-connected devices, wherein the cloud-based application is configured to prompt the user to purchase and download one or more or the following: music, music videos, television shows, audio books, movies, and movie rentals, and wherein the cloud-based application is associated with the mobile and wearable device of the user;

receiving, from the user, a registration request to register the user in a mobile payment service, wherein the user sends the registration request via the cloud-based application associated with the mobile and wearable device, the cloud-based application being associated with providing a free Voice over Internet Protocol service and a free Over-the-Top service;

securing the mobile and wearable device via a band to a part of a human body, the part of the human body including one or more of the following: a wrist, an arm, a neck, a bead, a leg, a waist, an ear, and a finger, securing, via the band, the mobile and wearable device being secured under, within or on clothing;

operably connecting a database to the mobile and wearable device, wherein the database is configured to store financial information of the user provided during the registering of the user;

associating the mobile and wearable device with an electronic payment card configured to act as one or more of a smart card, a proximity card, an integrated circuit card, a magnetic strip card, a Europay, MasterCard, and Visa (EMV) smart payment card, and an electronic payment card, the electronic payment card storing card data of one or more of debit cards, credit cards, gift cards, loyalty cards, prepaid cards, bank cards, identity cards, and membership cards, wherein the mobile and wearable device is equipped with an integrated smartcard, wherein the user waves the mobile and wearable device near a reader module to make a payment to the reader module;

providing a payment and multimedia capture interface on a display of the mobile and wearable device, wherein the payment and multimedia capture interface includes a haptic control configured to sense a haptic input of the user, wherein the payment and multimedia capture interface is further configured to receive a selection of an activity operation, wherein the activity operation includes one or more of the following: a messaging operation and a calling operation, wherein the receiving of the selection of the activity operation includes one or more of the following: a voice command, a haptic interaction with a touchscreen of the mobile and wearable device, and a move command;

sensing the haptic input via the haptic control, wherein the haptic input includes a touch of the user to the haptic control;

analyzing the haptic input to determine a duration of the haptic input;

based on the duration of the haptic input, selecting an operation from a list of predetermined operations to be performed by the cloud-based application, wherein the predetermined operations include at least a payment operation and a multimedia capture operation, wherein the mobile and wearable device is operable to perform both the payment operation and the multimedia capture operation, wherein the payment operation is associated with a payment request of the user;

in response to the multimedia capture operation being selected:
  capturing multimedia by a camera of the mobile and wearable device, the multimedia being stored to the cloud storage, wherein the multimedia includes a photo, a video, and a geographic location, and wherein the capturing includes grabbing screenshots off the mobile and wearable device, the screenshots including links including one or more of the following: a Shop Now Link, a Book Now Link, a Download link, a Learn More link, a Buy Now link, the Pay Now link, and a Sign Up link;
  selecting the haptic control for a particular type of multimedia content to be captured to provide captured multimedia;
  analyzing data associated with the haptic control;
  based on the analyzing, selecting one or more multimedia types for recording from the captured multimedia based on predetermined rules associated with a predetermined time of the providing the haptic control by the user;
  sending a command to a sensor of the mobile and wearable device to capture multimedia of the selected one or more multimedia types based on the predetermined rules:
  storing the one or more multimedia types in a memory, wherein the cloud-based application is coupled to a payment processor;

in response to the payment operation being selected:
  receiving payment details associated with the user from the cloud storage, the payment details being used to perform a payment via the mobile and wearable device;
  encrypting the payment request associated with the payment operation to obtain an encrypted payment request, wherein the encrypted payment request is decrypted by a further payment and multimedia application associated with a mobile and wearable device of a recipient, wherein the encrypted payment request is removed from the mobile and wearable device of the recipient after the encrypted payment request is optically read;
  transmitting the encrypted payment request to a financial organization; and
  storing information associated with the payment in the mobile and wearable device associated with the user, wherein the payment operation is authorized in part when a geographic location determined by the mobile and wearable device matches a geographic location of a merchant at a time of the selecting of the payment operation;

wherein the mobile and wearable device is operable to obtain information about a payment system of the user, wherein the mobile and wearable device is operable to generate and display a barcode that encodes user payment information, the barcode being scanned and processed at a checkout counter to retrieve the user payment information from a database of a payment processing system, the user payment information being used to transfer funds between the user and a service provider for an amount of the payment, wherein the service provider includes a merchant or a multimedia provider;

wherein the service provider provides the user with a compensation for future purchases made via the mobile payment service, the compensation being equal to the amount of the payment;

wherein the mobile and wearable device comprises one or more haptic control elements to control operation or functions of the mobile and wearable device, and controlling access to the mobile and wearable device is performed by one or more of the following: a password, a Personal Identification Number code, and biometric authorization, the biometric authorization including fingerprint scanning, palm scanning, face scanning, and retina scanning, wherein the scanning is performed using one or more biometric sensors, wherein the one or more biometric sensors include sensors for sensing a command for the payment operation to perform buying, the sensing shown on the display, the mobile and wearable device further comprising a fingerprint reader configured to scan a fingerprint, the scanned fingerprint being matched to one or more approved fingerprints, wherein access to the mobile and wearable personal is granted based on the matching; and wherein the camera of the mobile and wearable device is further configured to capture one or more codes, the one or more codes including the key data, a link to a web- resource, a payment request, and advertising information, wherein the one or more codes include one or more of the following: the barcode, a linear dimensional code, a two-dimensional code, a snap tag code, and a QR code.

18. The non-transitory computer-readable medium of claim 17, wherein the haptic input includes a touch of the user to the haptic control sensed by one or more sensors of the mobile and wearable device.

19. The non-transitory computer-readable medium of claim 17, wherein the haptic input is analyzed to determine the duration of the haptic input.

20. The non-transitory computer-readable medium of claim 17, wherein the duration of substantially one second is associated with the payment operation and the duration substantially exceeding one second is associated with the multimedia capture operation.

21. The non-transitory computer-readable medium of claim 17, wherein the payment operation provides payment details stored in the cloud storage and associated with the user, wherein the payment details are used to perform a payment via the mobile and wearable device.

22. The non-transitory computer-readable medium of claim 21, wherein the payment details include a data related to one or more of the following: a banking account associated with the user, a payment card associated with the user, and a virtual money account of the user.

23. The non-transitory computer-readable medium of claim 21, wherein the payment includes an internet payment and an NFC payment.

24. The non-transitory computer-readable medium of claim 17, wherein the multimedia includes a photo, a video, and a geographic location.

25. The non-transitory computer-readable medium of claim 17, wherein the key data is used to access the cloud storage.

26. The non-transitory computer-readable medium of claim 17, wherein the communication unit includes one or more of the following: an RFID chip, an NFC chip, one or more contacts for direct electrical connection a magnetic data-strip, and holographic data-strip.

27. The non-transitory computer-readable medium of claim 17, wherein the payment and multimedia capture means comprises:
  a Global Positioning System tracking unit attached to the payment and multimedia capture means and configured to track a geographic position of the payment and multimedia capture means and transmit the geographic position in response to a request from the mobile and wearable device;
  a lighting alarm unit attached to the payment and multimedia capture means and configured to emit light in response to a search command from the mobile and wearable device; and
  a sound alarm unit attached to the payment and multimedia capture means and configured to produce sound in response to a search command from the mobile and wearable device.

28. The non-transitory computer-readable medium of claim 17, wherein the payment and multimedia capture means comprises:
  a multimedia data access terminal for retrieving content data from a multimedia data supplier and providing the retrieved content data to an internet-connected data device, the terminal comprising:
    a first touch interface for communicating with the multimedia data supplier;
    a multimedia data device touch interface for interfacing with the multimedia data device;
    a program store platform storing code files implementable by a processor; and
    the processor, coupled to the first touch interface, to the multimedia data device touch interface, to the program store platform for implementing the stored code files, and one or more internet-connected devices, the code comprising:
      code files to read a payment data from the multimedia data device and to forward the payment data to a payment financial validation system;
      code files to receive payment financial validation data from the payment financial validation system; and
      code files responsive to the payment financial validation data to retrieve the data from the multimedia supplier and to write the retrieved multimedia data into the data device to perform a payment.

* * * * *